United States Patent Office 2,891,980
Patented June 23, 1959

2,891,980

ACETOXYMETHYLHEPTAMETHYLCYCLOTETRASILOXANE AND OILS PREPARED THEREFROM

Alfred R. Gilbert and Simon W. Kantor, Schenectady, N.Y., assignors to General Electric Company, a corporation of New York No Drawing. Application May 11, 1954
Serial No. 429,133

4 Claims. (Cl. 260—448.2)

This invention is concerned with a new composition of matter, acetoxymethylheptamethylcyclotetrasiloxane, having the structural formula

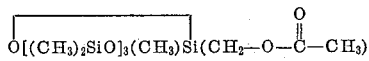

This invention is also concerned with a process for preparing the aforementioned compound, which process comprises effecting reaction between iodomethylheptamethylcyclotetrasiloxane and silver acetate. This invention is also concerned with a process of preparing organopolysiloxane oils containing acetoxymethyl radicals attached to silicon through a carbon-silicon linkage, which process comprises equilibrating acetoxymethylheptamethylcyclotetrasiloxane with a linear or branched-chain organopolysiloxane which is chain stopped with a trimethylsilyl radical, or with a cyclic dimethyl siloxane and the aforesaid chain-stopped compound.

Acetoxymethylheptamethylcyclotetrasiloxane is valuable per se as a hydraulic fluid and as a lubricant additive and is also valuable as an intermediate in the preparation of organopolysiloxane oils having excellent lubricating properties and good heat life.

Heretofore, attempts have been made to prepare acetoxymethylheptamethylcyclotetrasiloxane by the reaction of potassium acetate in glacial acetic acid with chloromethylheptamethylcyclotetrasiloxane. However, because of the relative inactivity of the chlorine atom attached to the silicon-bonded carbon, this has resulted in cleavage of silicon-oxygen linkages of the cyclic compound to form linear organopolysiloxanes instead of the acetoxymethyl cyclic compound. Attempts have also been made in the past to react potassium acetate with a mixture of a chlorinated linear dimethylsiloxane oil and glacial acetic acid to form linear compounds containing acetoxymethyl radicals attached to silicon through a carbon-silicon linkage. These attempts have resulted in oils containing some of the desired acetoxymethyl radicals attached to silicon, but it has been impossible by these methods to prepare a linear organopolysiloxane oil containing a controlled number of acetoxymethyl radicals attached to silicon through a carbon-silicon linkage.

We have discovered that acetoxymethylheptamethylcyclotetrasiloxane may be prepared in high yields by converting the known compound chloromethylheptamethylcyclotetrasiloxane to iodomethylheptamethylcyclotetrasiloxane and then converting the iodo compound to the acetoxy compound by treatment with silver acetate. The iodomethylheptamethylcyclotetrasiloxane, hereinafter referred to as "iodotetramer," may be prepared by reacting chloromethylheptamethylcyclotetrasiloxane, hereinafter referred to as "chlorotetramer," with sodium iodide in the presence of a suitable solvent. Although the ratio of chlorotetramer to sodium iodide may vary within wide limits, we prefer to use equimolar proportions of the two reactants, since the yield using equimolar proportions is from 80 to 90 percent and no increase in yield is found by varying the ratio. The reactants may be dissolved in any solvent which is inert with respect to the reactants and the products. A suitable solvent for the reaction has been found to be acetone. The quantity of the solvent used in the reaction may vary within wide limits, it being advantageous to have sufficient solvent to dissolve the reactants. The reaction is effected by heating the solution, preferably at the reflux temperature, until the reaction is completed. After the reaction, the iodotetramer may be removed from the reaction mixture by extraction with ether and may be purified by removal of the ether and fractional distillation of the residue.

Acetoxymethylheptamethylcyclotetrasiloxane, hereinafter referred to as "acetoxytetramer," may be prepared from the iodotetramer by reacting the latter compound with silver acetate in an acid medium. Although the ratio of iodotetramer to silver acetate may vary within wide limits, we prefer to use an equimolar ratio of the two reactants since this results in good yields of the acetoxytetramer. The acid reaction medium is preferably an organic acid, since silver acetate is soluble in many organic acids. The preferred acid is glacial acetic acid. The reaction is preferably effected by heating the reaction solution with stirring at a temperature from 50 to 100° C. until the reaction is completed. If desired, the reaction may be effected by heating the reaction mixture at its reflux temperature. Silver iodide, which is a product of the reaction, precipitates from the acid solution and may be separated after reaction by filtration. After the reaction, the products may be washed with water and the acetoxytetramer may then be extracted with ether. The acetoxytetramer may then be separated from the ether and purified by fractional distillation.

Linear or branched-chain liquid organopolysiloxanes containing controlled numbers of acetoxymethyl radicals attached to silicon through silicon-carbon bonds may be prepared by the process of the present invention by equilibrating acetoxytetramer with an organopolysiloxane mixture having the average formula (1) 

where R is an alkyl radical, and preferably a methyl radical, and $a$ has a value greater than 2.00.

Liquid methylpolysiloxanes containing acetoxymethyl radicals attached to silicon through silicon-carbon linkages have a heat life comparable to that of regular methyl silicone oils. For example, the acetoxymethyl silicone oils of the present invention may be used at temperatures as high as 200° C. for extended periods of time without discoloration. We have also found that the lubricating characteristics of these acetoxymethyl silicone oils may be controlled by controlling the number of acetoxymethyl radicals per silicon atom. As the ratio of acetoxymethyl radicals to silicon atoms increases, the lubricating characteristics of the oils are improved. By the method of our invention the number of acetoxymethyl radicals per silicon atom may be controlled by controlling the ratio of acetoxytetramer to organopolysiloxane of Formula 1.

The acetoxymethyl silicone oils of the present invention may be prepared by equilibrating acetoxytetramer with a methylpolysiloxane solution by the method taught in Patnode Patent No. 2,469,888. This method comprises treating the mixture of organopolysiloxanes with concentrated sulfuric acid and washing the treated product free of acid. This treatment will result in a liquid organopolysiloxane in which all of the valences of silicon other than the valences which make up the siloxane chain are satisfied by members selected from the class consisting of methyl radicals and acetoxymethyl radicals. The methylpolysiloxane with which the acetoxytetramer of the present invention is equilibrated may be a specific organopolysiloxane or a mixture of specific organopolysiloxanes having the formula (2) 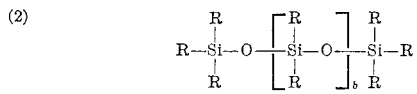

where R is methyl and $b$ is a whole number having a value of from 0 to 20 or more. Examples of specific compounds within the scope of Formula 2 include hexamethyldisiloxane, decamethyltetrasiloxane, octadecamethyloctasiloxane, etc. In addition, the methylpolysiloxane solution may be a mixture of methylpolysiloxanes falling within the scope of Formula 2 with a cyclic organopolysiloxane having the formula (3) 

where R is methyl and $c$ is an integer greater than 2, e.g., from 3 to 20 or more. Compounds within the scope of Formula 3 include, for example, hexamethylcyclotrisiloxane, octamethylcyclotetrasiloxane, decamethylcyclopentasiloxane, etc.

We prefer to prepare oils containing acetoxymethyl radicals attached to silicon by equilibrating a mixture of acetoxytetramer with octamethylcyclotetrasiloxane and hexamethyldisiloxane. Using these three compounds we are able to vary the chain length of the resulting oil by varying the ratio of the two cyclic compounds to the hexamethyldisiloxane. By using these three compounds we are also able to vary the ratio of acetoxymethyl radicals to silicon atoms by varying the ratio of the acetoxytetramer to the other two organopolysiloxanes used. In preparing a liquid methylpolysiloxane oil containing acetoxymethyl radicals attached to silicon by equilibration of acetoxytetramer, octamethylcyclotetrasiloxane, and hexamethyldisiloxane, the ratio of acetoxytetramer to octamethylcyclotetrasiloxane may vary within wide limits, for example, from about 0.1 to 5 parts, by weight, of acetoxytetramer per part of octamethylcyclotetrasiloxane, depending on the desired ratio of acetoxymethyl radicals to silicon atoms. The ratio of hexamethyldisiloxane to the total of the cyclic organopolysiloxanes also may vary within wide limits, for example, from about 0.1 to 20 parts, by weight, depending on the chain length desired in the resulting polysiloxane. Where an extra high ratio of acetoxymethyl radicals to silicon atoms is desired an oil may be prepared using only acetoxymethylheptamethylcyclotetrasiloxane with hexamethyldisiloxane as a chain stopper. The equilibration reaction is carried out by mixing the organopolysiloxane mixture with from about 1.0 to 10 percent, by weight, of concentrated sulfuric acid and stirring the mixture until equilibration has taken place. After equilibration, the resulting organopolysiloxane may be extracted with ether and purified by evaporating the ether from the solution.

Although this invention has been described with reference to the equilibration of acetoxymethylheptamethylcyclotetrasiloxane with methylpolysiloxanes, it should be understood that organopolysiloxanes containing organic radicals other than methyl may be used. For example, the organopolysiloxanes may be ethylpolysiloxanes or mixtures of methyl and ethylpolysiloxanes or phenylpolysiloxanes or mixtures of methyl and phenylpolysiloxanes.

The following examples are illustrative of the practice of our invention and are not intended for purposes of limitation.

*Example 1*

Iodomethylheptamethylcyclotetrasiloxane was prepared by adding 662 grams (2.0 mols) of chloromethylheptamethylcyclotetrasiloxane to 320 grams (2.12 mols) of sodium iodide in 2400 ml. of acetone. The mixture was then heated at reflux for 17 hours and then cooled and poured into four liters of ice water to precipitate the oily product. The oil was then washed with water and the combined water washings were extracted with 500 ml. of ether. The ether extract and the bulk of the oil were combined and dried over sodium sulfate. Fractional distillation of this product yielded iodomethylheptamethylcyclotetrasiloxane which boiled at 135 to 136° C. at 21 mm. which had a density $d_4^{20}$ 1.294, and which had a refractive index $n_D^{20}$ 1.4462. The molar refractivity, $MR_D$, of the product was 87.11 as compared with the theoretical value of 87.42. Analysis of the product showed it to contain 23.3% carbon, 5.6% hydrogen and 29.9% iodide. (Theoretical: 22.7% carbon, 5.5% hydrogen, and 30.0% iodide.)

*Example 2*

Acetoxymethylheptamethylcyclotetrasiloxane was prepared by stirring a mixture of 422.5 grams (1 mol) of iodomethylheptamethylcyclotetrasiloxane and 170 grams (1.02 mols) of silver acetate in three liters of glacial acetic acid for 20 hours at a temperature of 80° C. After cooling, the precipitated silver iodide was filtered and washed with 500 ml. of ether. The combined filtrate and ether washing was distilled under reduced pressure to remove the ether and acetic acid. The residue was poured into two liters of water and the precipitated oil was washed by decantation with another portion of water. The residue was then extracted with ether and this ether extract was washed, dried and distilled to yield acetoxymethylheptamethylcyclotetrasiloxane which boiled at 110.5° C. at 9 mm., which had a density $d_4^{20}$ 1.033, and which had a refractive index $n_D^{20}$ 1.2127. The molar refractivity $MR_D$ of this compound was 85.56, as compared with the theoretical value of 85.59. Analysis of the product showed it to contain 33.3% carbon, 7.8% hydrogen, and 31.9% silicon. (Theoretical: 33.9% carbon, 7.4% hydrogen and 31.7% silicon.) A six gram sample of this acetoxytetramer was refluxed with 120 ml. of 2 N hydrochloric acid for four hours. At the end of this time the acetoxytetramer was completely unchanged, showing that the acetoxy radical and the acetoxymethyl radical are not subject to acid cleavage.

*Example 3*

An organopolysiloxane oil was prepared by mixing 180 grams of octamethylcyclotetrasiloxane, 24 grams of acetoxymethylheptamethylcyclotetrasiloxane, 3.8 grams of hexamethyldisiloxane and 8 grams of concentrated sulfuric acid. After stirring this mixture for 29 hours at room temperature, 100 cc. of water was added and the mixture was stirred for an additional 24 hours. After standing overnight, the oily phase was separated and washed with aqueous sodium bicarbonate and allowed to stand over sodium carbonate and Celite for one day. The oil was filtered to give a clear, colorless product. Analysis of this oil showed it to contain 0.28 millimol of acetoxymethyl radicals per gram of oil as compared with the theoretical value of 0.325. This oil had a viscosity temperature coefficient of 0.59 and a lubricity measured as a wear scar of 1.92 mm. Lubricity is measured as the wear scar in a Shell four ball tester which comprises a device for holding three rigidly clamped one-half inch metal balls submerged in a lubricant in a metal cup. A fourth rotating ball of the same diameter is then pressed into contact with the three stationary balls by an adjustable loading arm and allowed to run for one hour. The contact points on the three stationary balls grow to circular scars as the wear progresses. The average diameter of these scars in millimeters after one hour's run at 600 r.p.m., with a 50 kilogram load, and with a rotating ball of steel and stationary steel balls is taken as the measurement of wear.

Example 4

By the method of Example 3 an oil was prepared from 150 grams of octamethylcyclotetrasiloxane, 60.1 grams of acetoxymethylheptamethylcyclotetrasiloxane, 3.8 grams of hexamethyldisiloxane, and 8 grams of concentrated sulfuric acid. Analysis of the resulting oil showed it to contain 0.725 millimole of acetoxymethyl radicals per gram of oil as compared with the theoretical value of 0.790. This oil had as viscosity temperature coefficient of 0.60 and a wear scar of 1.78 mm.

Example 5

By the method of Example 3 an oil was prepared from 95 grams of octamethylcyclotetrasiloxane, 104 grams of acetoxymethylheptamethylcyclotetrasiloxane, 3.8 grams of hexamethyldisiloxane, and 8 grams of concentrated sulfuric acid. Chemical analysis of the resulting oil showed it to contain 1.34 millimoles of acetoxymethyl radicals per gram of sample as compared with the theoretical value of 1.44. This oil had a viscosity temperature coefficient of 0.62 and a wear scar of 1.54 mm.

Example 6

By the method of Example 3 an oil was prepared from 41.7 grams of octamethylcyclotetrasiloxane, 150 grams of acetoxymethylheptamethylcyclotetrasiloxane, 3.8 grams of hexamethyldisiloxane, and 8 grams of concentrated sulfuric acid. The resulting oil was analyzed and found to contain 2.00 millimoles of acetoxymethyl radicals per gram of oil as compared with the theoretical value of 2.16. This oil had a viscosity temperature coefficient of 0.63 and a wear scar of 1.44 mm.

Example 7

By the method of Example 3 an oil was prepared from 100 grams of acetoxymethylhexptamethylcyclotetrasiloxane, 1.9 grams of hexamethyldisiloxane and 4 grams of concentrated sulfuric acid. Analysis of this oil showed it to contain 2.8 millimoles of acetoxymethyl radicals per gram of sample as compared with the theoretical value of 2.76. This oil had a viscosity temperature of 0.63.

What we claim as new and desire to secure by Letters Patent of the United States is:

1. The process of preparing acetoxymethylheptamethylcyclotetrasiloxane which process comprises effecting reaction at a temperature of from 50° C. up to the reflux temperature of the reaction mixture and in an organic acid medium between iodomethylhexptamethylcyclotetrasiloxane and silver acetate.

2. The process of claim 1 in which the acid medium is glacial acetic acid.

3. The process of preparing a liquid trimethylsilyl chain-stopped organopolysiloxane containing a controlled number of acetoxymethyl radicals attached to silicon and a controlled chain length, which process comprises equilibrating in the presence of a rearrangement catalyst (1) acetoxymethylheptamethycyclotetrasiloxane with (2) an organopolysiloxane having the average formula

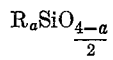

where R is a methyl radical and $a$ has a value greater than 2.00, there being present on a weight basis from 0.1 to 5 parts of the acetoxymethylheptamethylcyclotetrasiloxane per part of the above organopolysiloxane, the rearrangement catalyst being present, by weight in an amount equal to from 1 to 10 percent, by weight, based on the total weight of the cyclic polysiloxane and the aforesaid organopolysiloxane, and thereafter removing the formed trimethylsilyl chain-stopped organopolysiloxane and freeing it of any rearrangement catalyst present therein.

4. The process of preparing a liquid trimethylsilyl chain-stopped organopolysiloxane containing a predetermined number of acetoxymethyl radicals attached to silicon through silicon-carbon linkages and having a predetermined chain length, which process comprises equilibrating with sulfuric acid a mixture of ingredients comprising (1) octamethylcyclotetrasiloxane, (2) hexamethyldisiloxane, and (3) acetoxymethylheptamethylcyclotetrasiloxane to provide the predetermined number of acetoxymethyl radicals and the predetermined chain length, the sulfuric acid being present in an amount, by weight, equal to from 1 to 10 percent of the total weight of (1), (2) and (3), the ratio of acetoxymethylheptamethylcyclotetrasiloxane to octamethylcyclotetrasiloxane being within the range of from 0.1 to 5 parts, by weight of the former per part of the octamethylcyclotetrasiloxane, and the hexamethyldisiloxane within the weight range of from about 0.1 to 20 parts of the latter per part of the total weight of the cyclic organopolysiloxanes, and thereafter isolating the formed trimethylsilyl chain-stopped organopolysiloxane.

References Cited in the file of this patent

UNITED STATES PATENTS

| | | |
|---|---|---|
| 2,469,888 | Patnode | May 10, 1949 |
| 2,550,205 | Speier | Apr. 24, 1951 |

FOREIGN PATENTS

| | | |
|---|---|---|
| 635,733 | Great Britain | Apr. 12, 1950 |

OTHER REFERENCES

Feiser and Feiser: "Organic Chemistry," D. C. Heath and Co., Boston (1944), page 180.

Rochow: "Chemistry of the Silicones," 2nd edition (1952), page 84.